(12) United States Patent
Tehranipoor et al.

(10) Patent No.: US 11,704,415 B2
(45) Date of Patent: Jul. 18, 2023

(54) METHOD, APPARATUS AND COMPUTER PROGRAM PRODUCT FOR PROTECTING CONFIDENTIAL INTEGRATED CIRCUIT DESIGN

(71) Applicant: University of Florida Research Foundation, Incorporated, Gainesville, FL (US)

(72) Inventors: Mark M. Tehranipoor, Gainesville, FL (US); Andrew C. Stern, Gainesville, FL (US); Adib Nahiyan, Gainesville, FL (US); Farimah Farahmandi, Gainesville, FL (US); Fahim Rahman, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 181 days.

(21) Appl. No.: 16/924,919

(22) Filed: Jul. 9, 2020

(65) Prior Publication Data

US 2021/0012016 A1     Jan. 14, 2021

Related U.S. Application Data

(60) Provisional application No. 62/872,657, filed on Jul. 10, 2019.

(51) Int. Cl.
*G06F 21/60*     (2013.01)
*G06F 30/327*     (2020.01)
*H04L 9/08*     (2006.01)

(52) U.S. Cl.
CPC .......... *G06F 21/602* (2013.01); *G06F 30/327* (2020.01); *H04L 9/0819* (2013.01); *H04L 2209/16* (2013.01)

(58) Field of Classification Search
CPC ... G06F 21/602; G06F 30/327; H04L 9/0819; H04L 2209/16
See application file for complete search history.

(56) References Cited

U.S. PATENT DOCUMENTS

| | | | |
|---|---|---|---|
| 9,690,894 B1 * | 6/2017 | Titley | G06F 30/34 |
| 2011/0113392 A1 * | 5/2011 | Chakraborty | G09C 1/00 716/102 |

(Continued)

*Primary Examiner* — Alexander Lagor
*Assistant Examiner* — Zoha Piyadehghibi Tafaghodi
(74) *Attorney, Agent, or Firm* — Alston & Bird LLP

(57) ABSTRACT

Methods, apparatus and computer program product for protecting a confidential integrated circuit design process. The computer-implemented method includes receiving a design specification dataset from a first untrusted computing device; extracting confidential design specification data from the design specification dataset; encrypting the confidential design specification data to produce encrypted confidential design specification data; generate a first encryption key to be associated with the encrypted confidential design specification data; retrieving a confidential design specification data subset for replacing a design element subset with a security hard macro (SHM) placeholder design element set; generating a security hard macro (SHM) placeholder feature set comprising those security hard macro (SHM) placeholder features representing mappings from the confidential design specification data subset to the SHM placeholder design element set; and transmitting, to the first untrusted computing device, the encrypted confidential design specification data, the first encryption key, and the SHM placeholder feature set.

20 Claims, 11 Drawing Sheets

(56) References Cited

U.S. PATENT DOCUMENTS

| | | | |
|---|---|---|---|
| 2013/0144589 A1* | 6/2013 | Levi | G06F 30/33 |
| | | | 703/14 |
| 2014/0156872 A1* | 6/2014 | Buer | G06F 21/53 |
| | | | 710/8 |
| 2017/0103236 A1* | 4/2017 | Homayoun, Jr. | G06F 21/76 |
| 2018/0046812 A1* | 2/2018 | Kaushik | G06F 21/602 |
| 2018/0165477 A1* | 6/2018 | Su | G06F 30/39 |
| 2018/0302281 A1* | 10/2018 | Khan | G06F 30/327 |

\* cited by examiner

Priming Stage

Synthesis and SHM Insertion Stage

Functional Recovery Stage

Access Control Mechanism

METHOD, APPARATUS AND COMPUTER PROGRAM PRODUCT FOR PROTECTING CONFIDENTIAL INTEGRATED CIRCUIT DESIGN

CROSS-REFERENCE TO RELATED APPLICATIONS

The present application claims priority to U.S. Provisional Application Ser. No. 62/872,657, titled "METHOD, APPARATUS AND COMPUTER PROGRAM PRODUCT FOR PROVIDING CONFIDENTIAL INTEGRATED CIRCUIT DESIGN," filed Jul. 10, 2019, the contents of which are incorporated herein by reference in their entirety.

BACKGROUND

The semiconductor industry has become a lucrative target for powerful adversaries such as wealthy foundries or national forces. The easiest point of entry for these adversaries is to hire employees who are a part of (or have been placed in) typically trusted semiconductor design companies and pay them handsomely for any IP they are able to extract from their company and work with the adversary to develop competing technologies. Today, an SoC engineer may have access to a large portion, if not an entire system-on-chip (SoC) design at some point during the design process. Since the engineer has unrestricted access to the design tools, the digital data or IP can be directly extracted from the tool flow. The lack of protection provides a large attack surface for an adversary as shown in FIG. 1. Insider attacks pose a major threat to the modern IC design flow. Without proper countermeasures in place, malicious insiders can successfully extract design files from several stages within the current flow. Mitigating these issues prior to escalation is key to national security and economic strength.

Applicant has identified many deficiencies and problems associated with existing methods, apparatus, and systems. Through applied effort, ingenuity, and innovation, these identified deficiencies and problems have been solved by developing solutions that are in accordance with the embodiments of the present disclosure, many examples of which are described in detail herein.

BRIEF SUMMARY

In general, embodiments of the present disclosure provide methods, apparatus, systems, computing devices, and/or the like for protecting confidential integrated circuit (IC) design comprising one or more of a priming stage, a synthesis and security hard macro (SHM) insertion stage, or a functional recovery stage in an IC design process.

In accordance with one aspect, an apparatus is provided. The apparatus comprises at least one processor and at least one non-transitory memory including program code. The at least one non-transitory memory and the program code are configured to, with the at least one processor, cause the apparatus to at least receive, from a first untrusted computing device, a design specification dataset comprising confidential design specification data and non-confidential design specification data, wherein the confidential design specification data is associated with a design element set. The at least one non-transitory memory and the program code are configured to, with the at least one processor, further cause the apparatus to extract the confidential design specification data from the design specification dataset. The at least one non-transitory memory and the program code are configured to, with the at least one processor, further cause the apparatus to encrypt/obfuscate the confidential design specification data to produce encrypted/obfuscated confidential design specification data. The at least one non-transitory memory and the program code are configured to, with the at least one processor, further cause the apparatus to generate a first encryption/obfuscation key to be associated with the encrypted/obfuscated confidential design specification data. The at least one non-transitory memory and the program code are configured to, with the at least one processor, further cause the apparatus to retrieve a confidential design specification data subset for replacing a design element subset with a security hard macro (SHM) placeholder design element set, wherein the confidential design specification data subset is retrieved based at least in part on a security hard macro (SHM) placeholder portfolio associated with a plurality of security hard macro (SHM) placeholder features, and wherein each SHM placeholder feature of the plurality of SHM placeholder features representing a mapping from a particular confidential design specification data subset to a particular security hard macro (SHM) placeholder design element. The at least one non-transitory memory and the program code are configured to, with the at least one processor, further cause the apparatus to generate a security hard macro (SHM) placeholder feature set that comprises those SHM placeholder features representing mappings from the confidential design specification data subset to the SHM placeholder design element set. The at least on non-transitory memory and program code are configured to, with the at least one processor, further cause the apparatus to transmit, to the first untrusted computing device, one of the encrypted confidential design specification data or the obfuscated confidential design specification data, one of the first encryption key or the first obfuscation key, and the SHM placeholder feature set.

In accordance with another aspect, the at least one non-transitory memory and the program code are configured to, with the at least one processor, further cause the apparatus to receive, from the first untrusted computing device, the SHM placeholder feature set, and one of the first encryption key or the first obfuscation key. The first encryption key or the first obfuscation key authorizes the first untrusted computing device to access the confidential design specification data. The at least one non-transitory memory and the program code are configured to, with the at least one processor, further cause the apparatus to decrypt, using one of the first encryption key or the first obfuscation key, one of the encrypted confidential design specification data or the obfuscated confidential design specification data to retain the confidential design specification data. The at least one non-transitory memory and the program code are configured to, with the at least one processor, further cause the apparatus to synthesize the confidential design specification data into the design element set. The at least one non-transitory memory and the program code are configured to, with the at least one processor, further cause the apparatus to replace, based at least in part on the SHM placeholder feature set, the design element subset with the SHM placeholder design element set to form an updated design element set. The at least one non-transitory memory and the program code are configured to, with the at least one processor, further cause the apparatus to generate netlist data comprising a plurality of electronic connections among design elements of the updated design element set. The at least one non-transitory memory and the program code are configured to, with the at least one processor, further cause the apparatus to transmit, to a second untrusted computing device, the netlist data.

In accordance with another aspect, the at least one non-transitory memory and the program code are configured to, with the at least one processor, further cause the apparatus to receive, from the second untrusted computing device, modified netlist data based at least in part on the netlist data, wherein the modified netlist data comprises a plurality of electronic connections among design elements of a modified design element set. The at least one non-transitory memory and the program code are configured to, with the at least one processor, further cause the apparatus to retrieve a modified design element subset comprising a modified security hard macro (SHM) placeholder design element set. The at least one non-transitory memory and the program code are configured to, with the at least one processor, further cause the apparatus to generate a modified security hard macro (SHM) placeholder feature set based at least in part on the modified SHM placeholder design element set by selecting SHM placeholder features representing mappings from the modified SHM placeholder design element set to a modified confidential design specification data subset. The at least one non-transitory memory and the program code are configured to, with the at least one processor, further cause the apparatus to extract the modified design element set based at least in part on the modified SHM placeholder feature set. The at least one non-transitory memory and the program code are configured to, with the at least one processor, further cause the apparatus to transform the modified design element set into the modified confidential design specification data subset based at least in part on the SHM placeholder portfolio to generate modified confidential design specification data. The at least one non-transitory memory and the program code are configured to, with the at least one processor, further cause the apparatus to transmit, to the first untrusted computing device, the modified confidential design specification data.

In accordance with another aspect, the at least one non-transitory memory and the program code are configured to, with the at least one processor, further cause the apparatus to receive, from a networked computing device associated with a device identifier, a logging request for retrieving the confidential design specification data or the modified confidential design specification data. Upon determining that an access level associated with the device identifier meets or exceeds a pre-defined security access level, the at least one non-transitory memory and the program code are configured to, with the at least one processor, further cause the apparatus to grant access by the networked computing device to the confidential design specification data or the modified confidential design specification data.

In accordance with another aspect, the at least one non-transitory memory and the program code are configured to, with the at least one processor, further cause the apparatus to extract the non-confidential design specification data from the design specification dataset. The at least one non-transitory memory and the program code are configured to, with the at least one processor, further cause the apparatus to encrypt/obfuscate the non-confidential design specification data to produce encrypted/obfuscated non-confidential design specification data. The at least one non-transitory memory and the program code are configured to, with the at least one processor, further cause the apparatus to generate one of a second encryption key or a second obfuscation key to be associated with the encrypted non-confidential design specification data or the obfuscated non-confidential design specification data. The at least one non-transitory memory and the program code are configured to, with the at least one processor, further cause the apparatus to transmit, to the first untrusted computing device, one of the encrypted non-confidential design specification data or the obfuscated non-confidential design specification data, and one of the second encryption key or the second confiscation key.

In accordance with another aspect, the at least one non-transitory memory and the program code are configured to, with the at least one processor, further cause the apparatus to receive, from the first untrusted computing device, one of the second encryption key or the second obfuscation key. The second encryption key or the second obfuscation key authorizes the first untrusted computing device to access the non-confidential design specification data. The at least one non-transitory memory and the program code are configured to, with the at least one processor, further cause the apparatus to decrypt, using the second encryption key or the second obfuscation key, one of the encrypted non-confidential design specification data or the obfuscated non-confidential design specification data to retain the non-confidential design specification data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1:
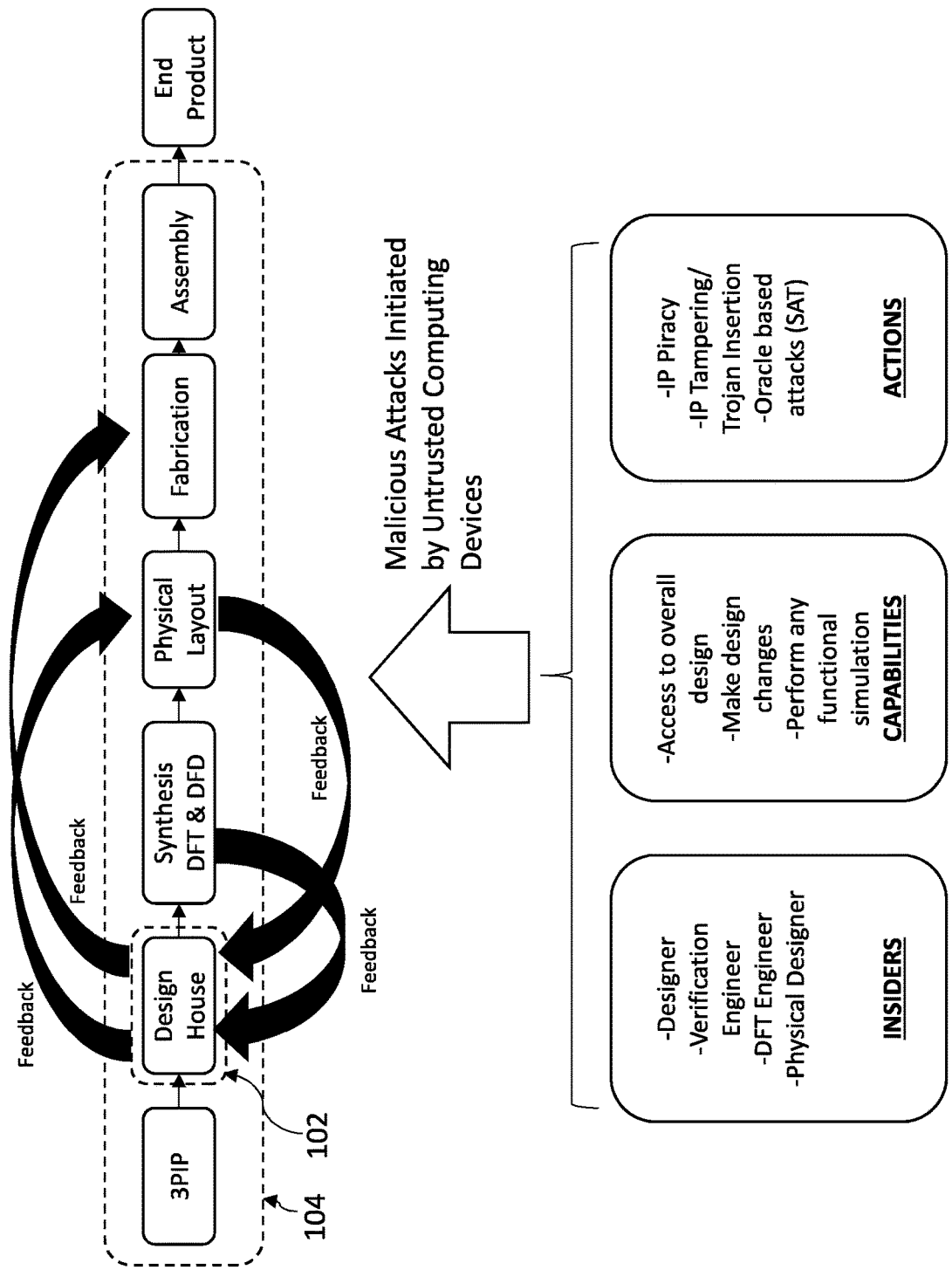
Figure 2:
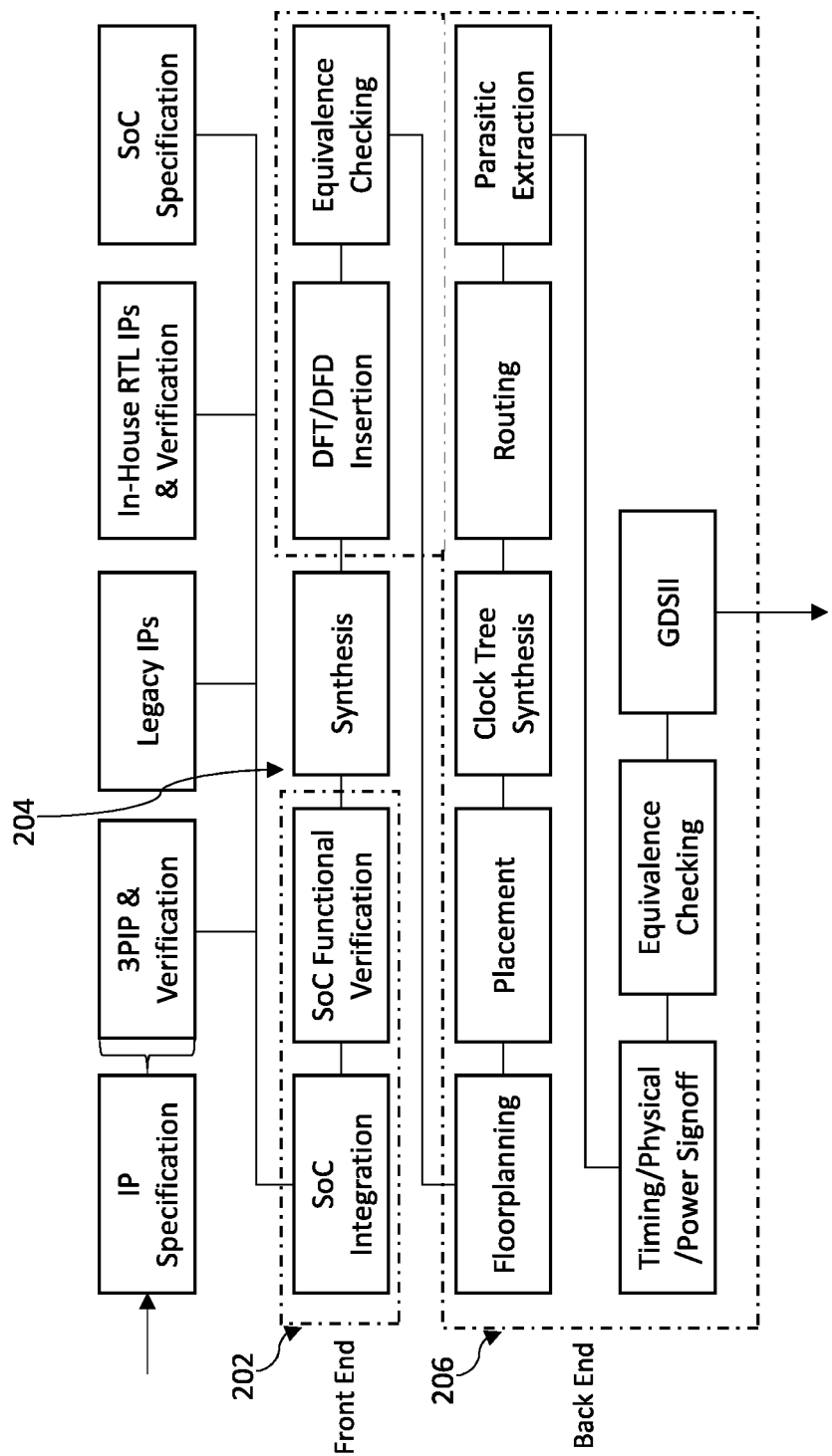
Figure 3:
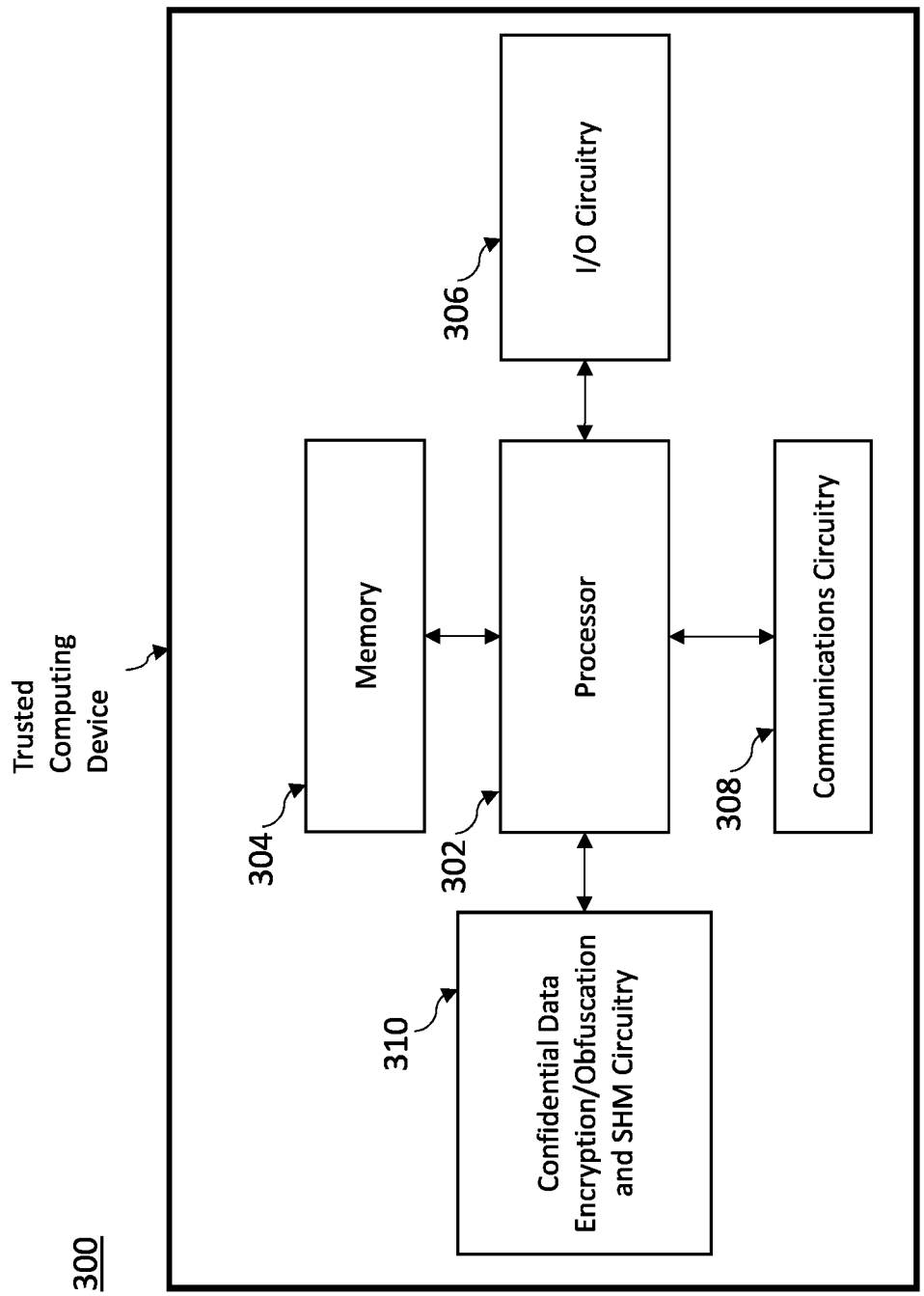
Figure 4:
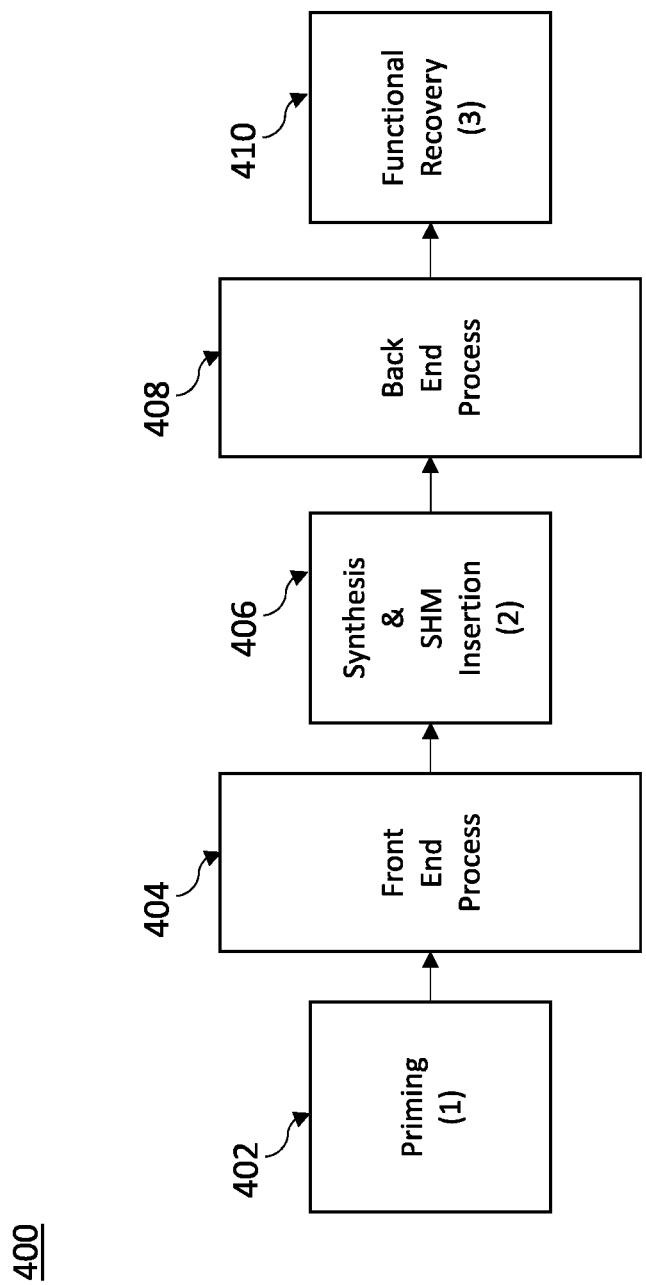
Figure 5:
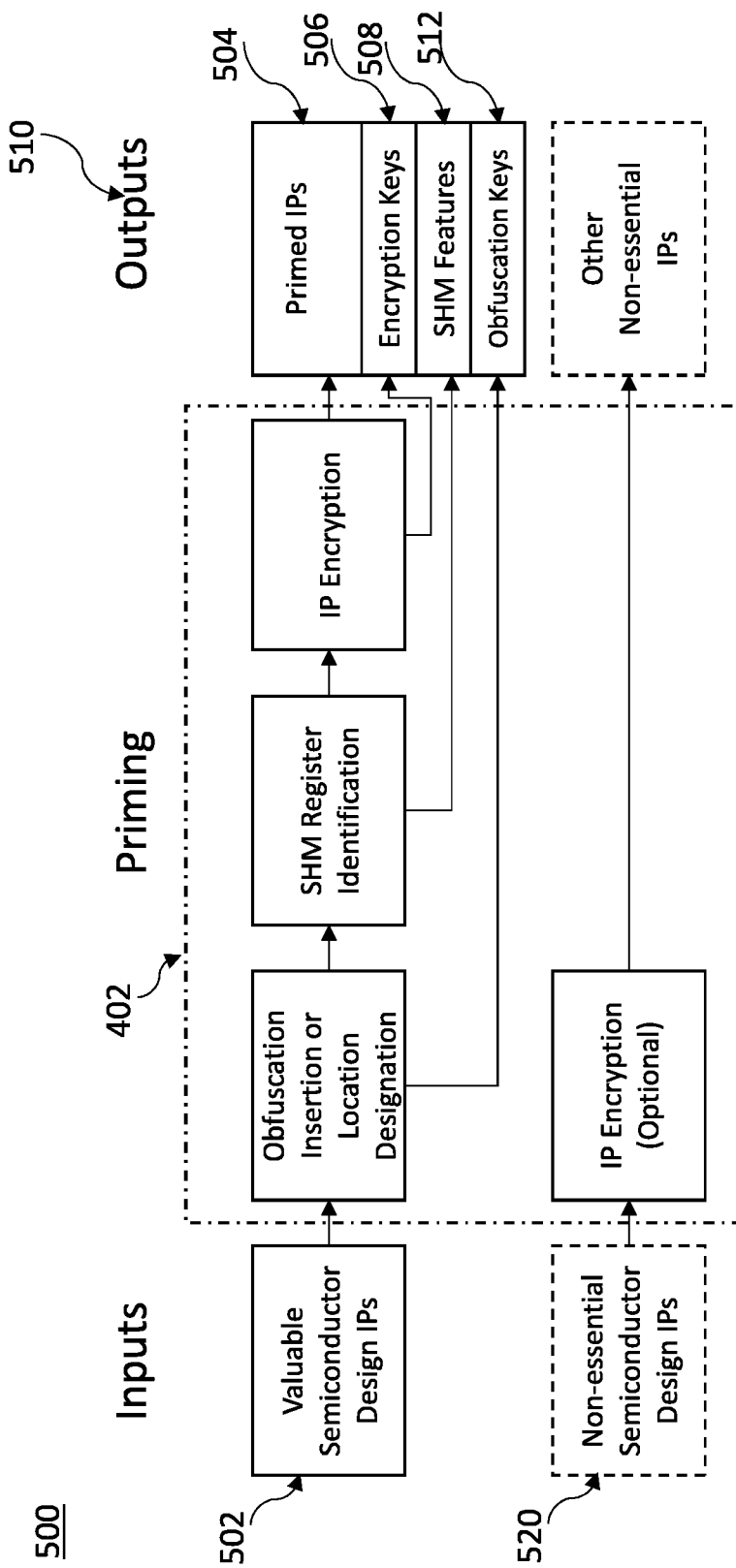
Figure 6:
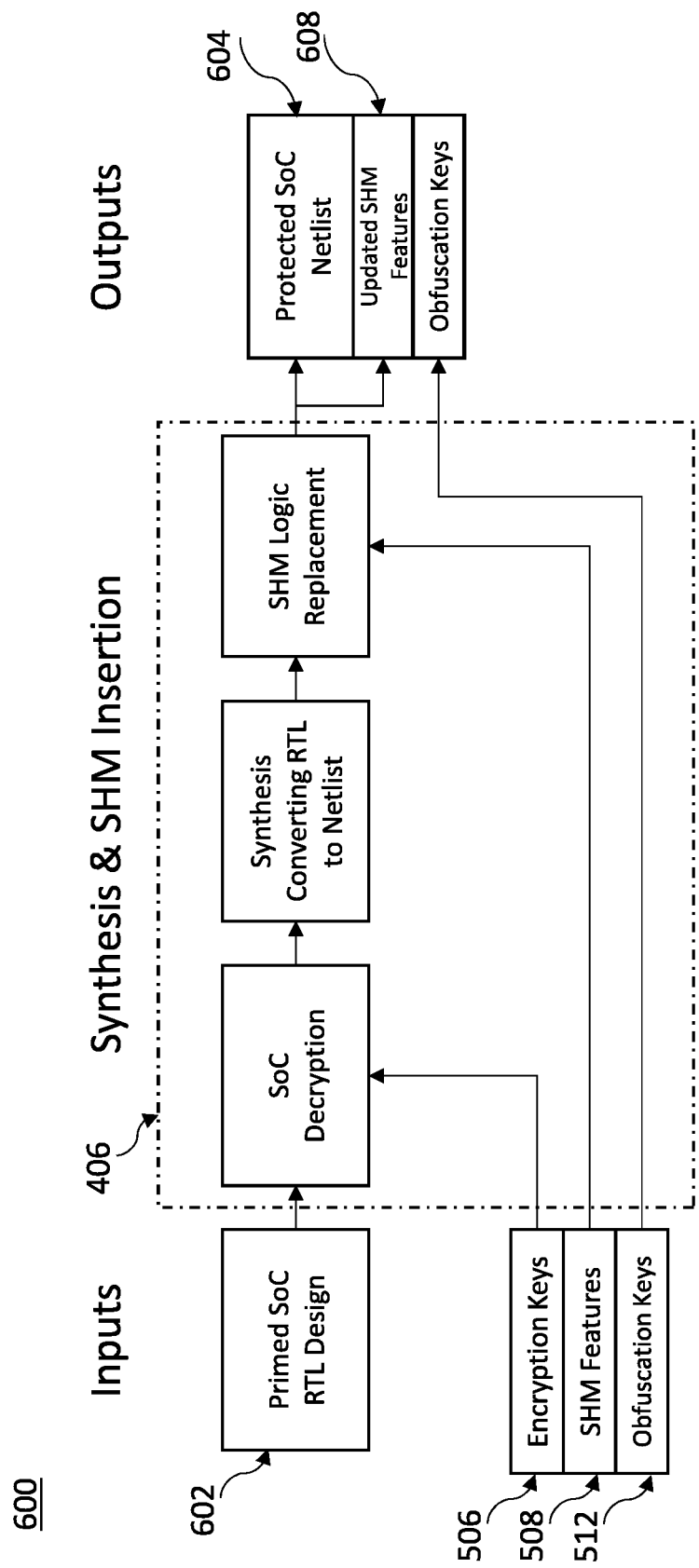
Figure 7:
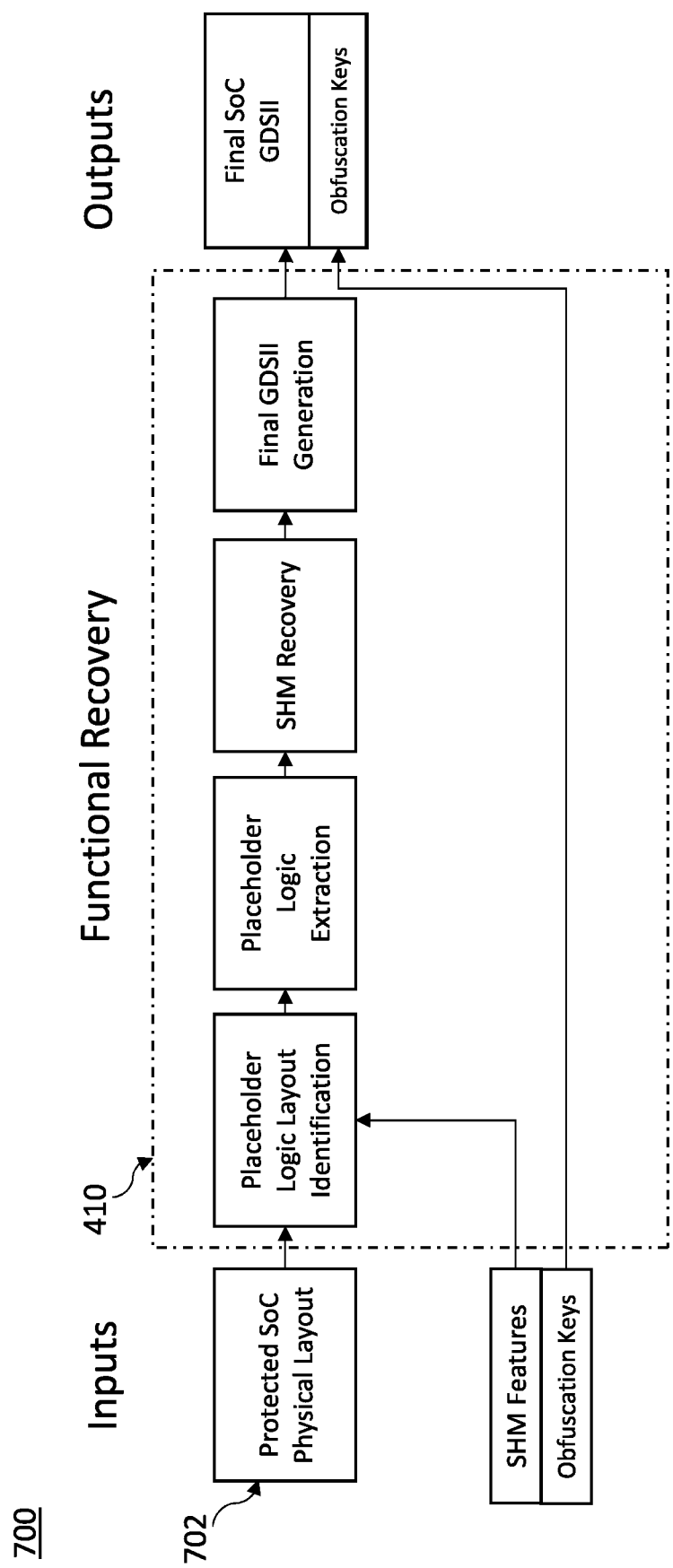
Figure 8:
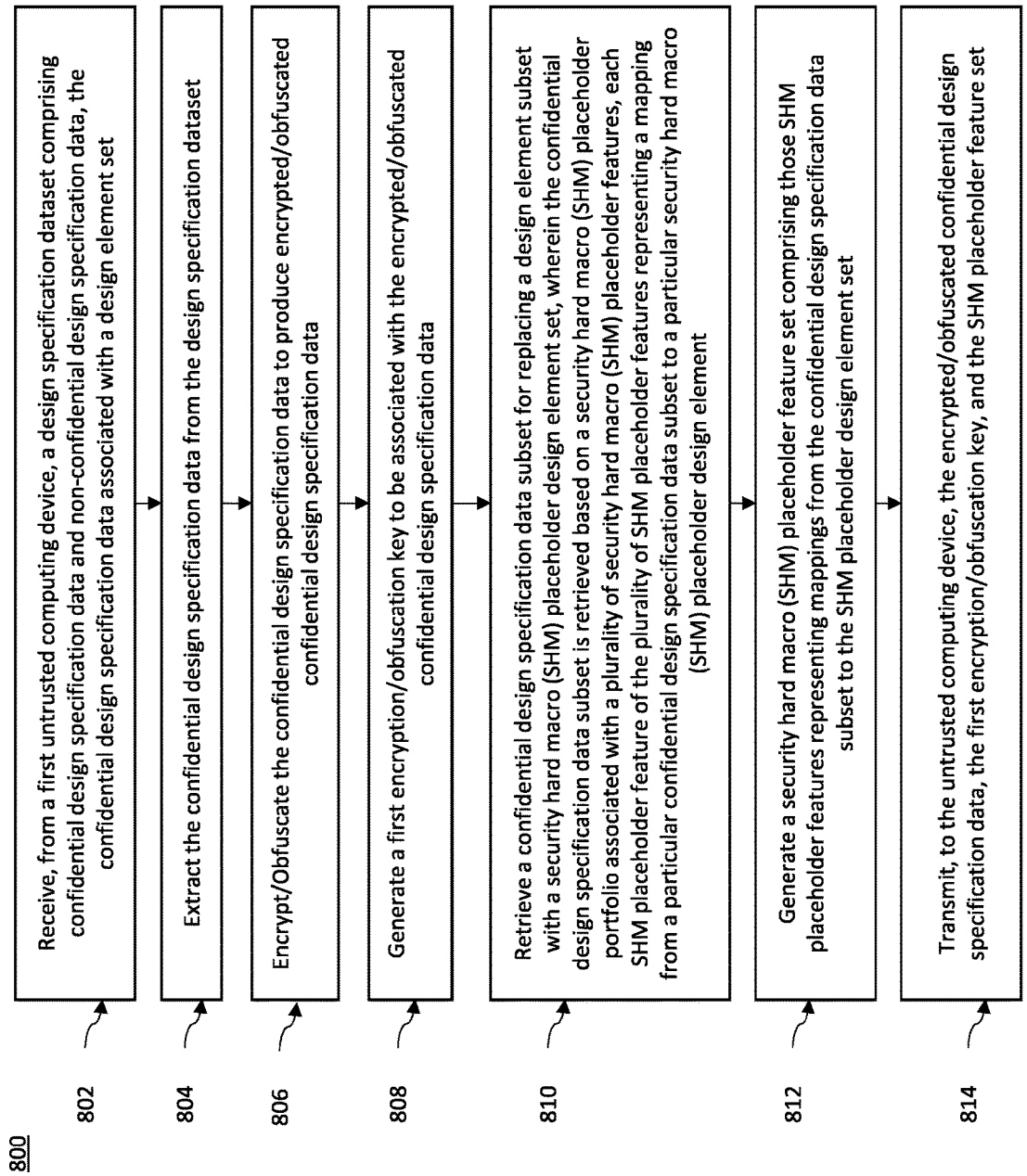
Figure 9:
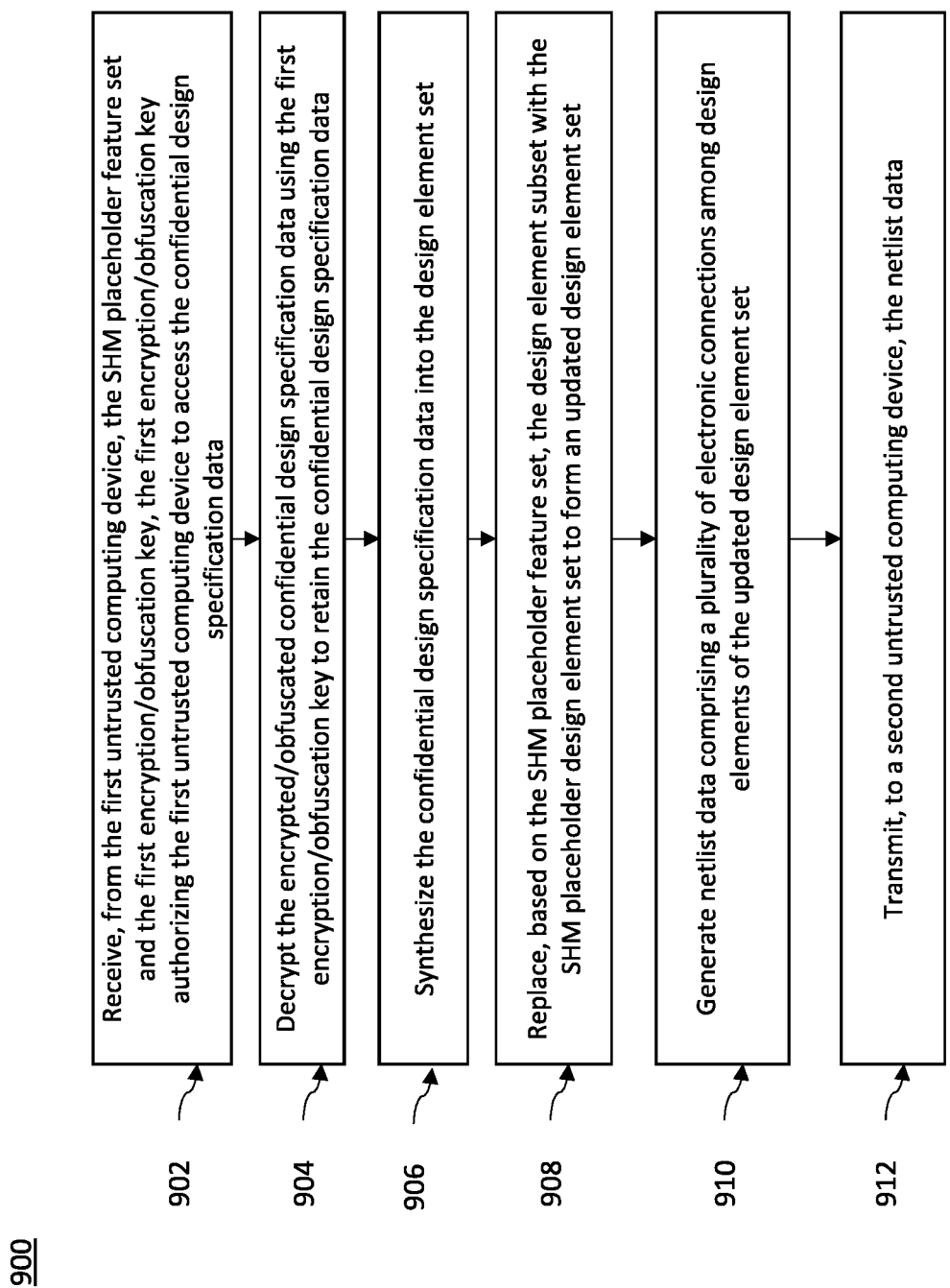
Figure 10:
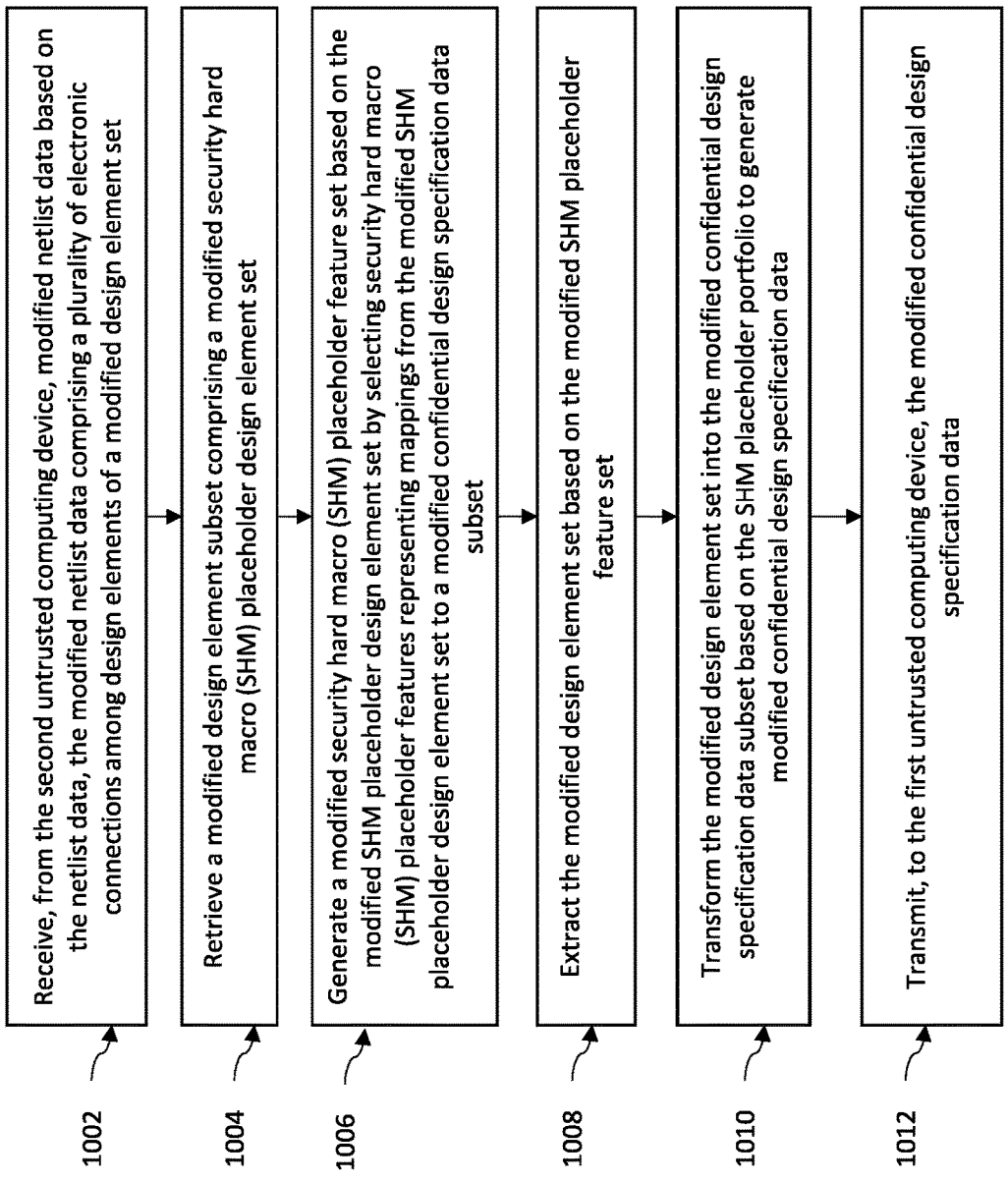
Figure 11:
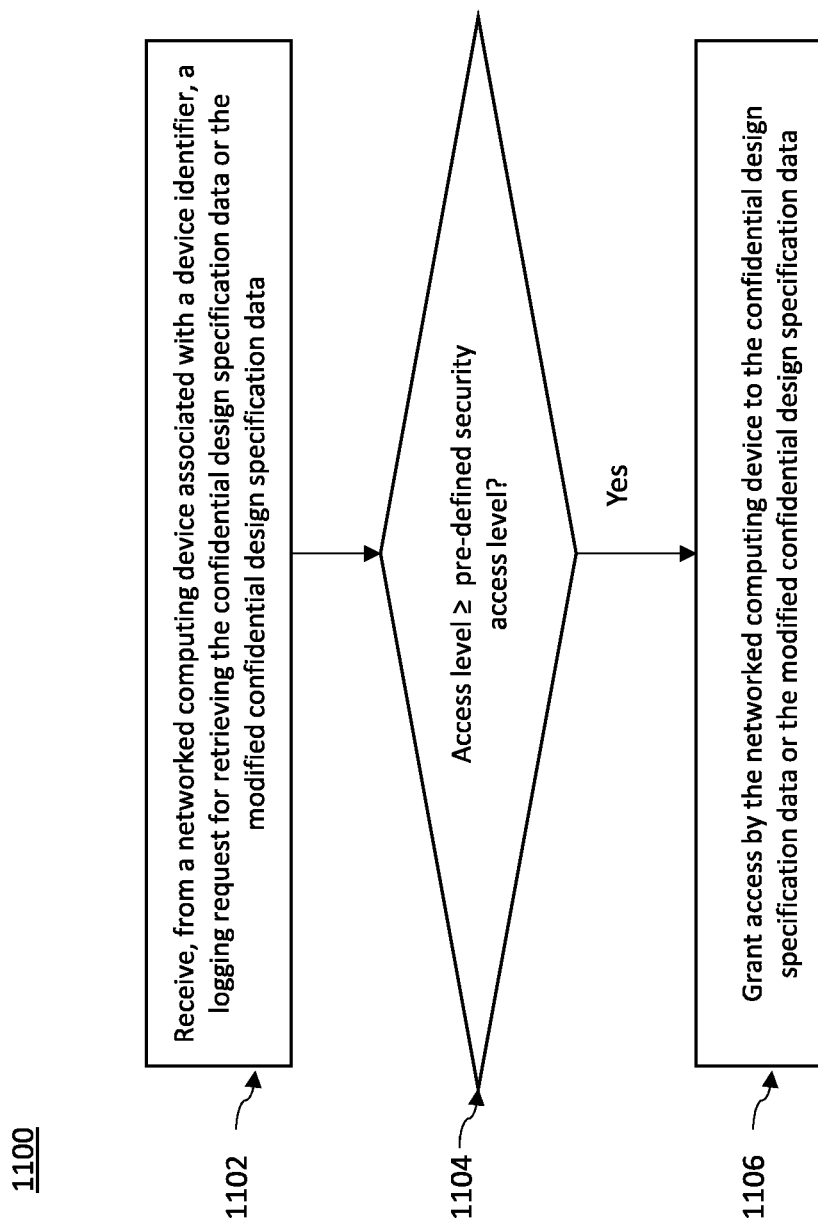

Having thus described some embodiments in general terms, references will now be made to the accompanying drawings, which are not drawn to scale, and wherein:

FIG. 1 illustrates an example of various malicious attacks initiated by untrusted computing devices during an integrated circuit (IC) design process;

FIG. 2 illustrates an example IC design process;

FIG. 3 illustrates an example trusted computing device schematic diagram, in accordance with some embodiments of the present disclosure;

FIG. 4 illustrates an example flow chart illustrating an example method for providing a confidential IC design process, in accordance with some embodiments of the present disclosure;

FIG. 5 illustrates an example flow chart illustrating an example protection mechanism in a priming stage of a confidential IC design process, in accordance with some embodiments of the present disclosure;

FIG. 6 illustrates an example flow chart illustrating an example protection mechanism in a synthesis and SHM insertion stage of a confidential IC design process, in accordance with some embodiments of the present disclosure;

FIG. 7 illustrates an example flow chart illustrating an example protection mechanism in a functional recovery stage of a confidential IC design process, in accordance with some embodiments of the present disclosure;

FIG. 8 illustrates an example flow chart illustrating an example method for providing a protection mechanism in a priming stage of a confidential IC design process, in accordance with some embodiments of the present disclosure;

FIG. 9 illustrates an example flow chart illustrating an example method for providing a protection mechanism in a synthesis and SHM insertion stage of a confidential IC design process, in accordance with some embodiments of the present disclosure;

FIG. 10 illustrates an example flow chart illustrating an example method for providing a protection mechanism in a functional recovery stage of a confidential IC design process, in accordance with some embodiments of the present disclosure; and FIG. 11 illustrates an example flow chart illustrating an example method for providing an access control mechanism in a confidential IC design process, in accordance with some embodiments of the present disclosure.

DETAILED DESCRIPTION OF VARIOUS EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the disclosure generally relate to a method for providing a confidential integrated circuit (IC) design process. More specifically, various embodiments of the present disclosure are related to introducing protection mechanisms, such as inserting one of a priming stage, a synthesis and security hard macro (SHM) insertion stage, or a functional recovery stage in a typical IC design process, for providing a confidential IC design process. Various embodiments of the disclosure utilize data encryption, data obfuscation, SHM functional replacement and recovery, or access control mechanisms in different stages of an IC design process to form a confidential IC design environment.

FIG. 1 is an example of various malicious attacks initiated by untrusted computing devices during an integrated circuit (IC) design process. A typical IC design process includes various IC design entities 104, each operated by a user of an IC design entity involved in the IC design supply chain. The typical IC design entities 104 involved in the IC design supply chain include a third-party intellectual property (3PIP) entity, a design house entity, a synthesis design-for-test (DFT) and design-for-debug (DFD) entity, a physical layout entity, a fabrication entity, and an assembly entity, for generating an IC design end product. Among those IC design entities 104, the design house entity 102 is designated as the center of trust essential for protecting the core design ideas of an IC design end product. The design house entity 102 may receive feedback from entities in the later or earlier stages of the IC design process as shown in FIG. 1. Such feedback is crucial to the IC design process in that it is used to iterate and debug design issues appearing at various stages during the IC design process.

FIG. 2 is an example IC design process. FIG. 2 provides additional details in the typical IC design process including processes from an IP specification design process, such as designing confidential IC design specification data, to an IC design end product process, such as generating a Graphic Database System (GDSII) file. In general, the typical IC design process may be divided into three major stages, including a front-end processing stage, a synthesis stage, and a back-end processing stage. The front-end processing stage includes, but is not limited to, a system-on-chip (SoC) integration process and an SoC functional verification process. The back-end processing stage includes, but is not limited to, a DFT/DFD insertion process, an equivalence checking process, a floor planning process, a placement process, a clock tree synthesis process, a routing process, a parasitic extraction process, a timing/physical/power signoff process, an equivalence checking process, and a GDSII generation process.

Due to the globalization of the IC design industry, each IC design entity illustrated in FIG. 1 may be an external entity or a third-party entity located in a geographical region that is different from the design house entity 102. Each IC design entity illustrated in FIG. 1 may be responsible for conducting one or more processes illustrated in FIG. 2 during the IC design process. In such a globalized IC design business model, there are multiple vulnerable points of entry during the typical IC design process for malicious users operating untrusted computing devices to initiate attacks. For example, a malicious user operating an untrusted computing device may extract confidential IC design specification data from the feedbacks during the feedback transmission between two IC design entities. By way of further example, a malicious insider may extract confidential IC design specification data as a result of having unrestricted access to the confidential IC design specification data. As shown in FIG. 1, possible malicious attacks may be initiated by insiders, such as IC design engineers, verification engineers, DFT engineers, or physical design engineers. Possible malicious attacks may be initiated by personnel capable of accessing to overall design during the design process, making design changes, or performing functional simulations. Possible malicious attacks may also be initiated by outsiders by way of actions associated with intellectual property (IP) piracy, IP tampering or Trojan insertion, Oracle-based attacks, and/or the like.

Some existing systems and approaches may address the above malicious attacking issues through access control mechanisms designed to protect confidential IC design specification data. Upon receiving an access request from a user operating a computing device, existing systems and approaches may identify the computing device based at least in part on its associated device identifier and determine whether to grant access for the computing device to access confidential IC design specification data. Even though these conventional methods may provide real-time identification of potential malicious users, they cannot prevent malicious insiders employed by any of the IC design entities and having high access level to the confidential IC design specification data.

Systems structured in accordance with various embodiments of the present disclosure overcome challenges faced by existing systems by way of utilizing protection techniques, such as data encryption, data obfuscation, or SHM functional replacement and recovery, to protect confidential data against both malicious insiders and outsiders of the IC design process. For example, systems structured in accordance with various embodiments of the present disclosure may utilize data encryption or obfuscation, along with SHM functional identification techniques at the priming stage prior to a series of front-end processes illustrated in FIG. 2. Systems structured in accordance with various embodiments of the present disclosure may utilize data encryption or obfuscation, along with SHM functional replacement technique at the synthesis stage. Systems structured in accordance with various embodiments of the present disclosure may also utilize data encryption, data obfuscation, and SHM functional recovery technique after a series of back-end processes as illustrated in FIG. 2. Through utilizing protection mechanisms at different stages of the IC design process, systems structured in accordance with various embodiments of the present disclosure may strengthen security protection against both malicious insiders and outsiders. Specifically, insiders employed by any design entity during the IC design process may only have access to encrypted or obfuscated confidential IC specification design data, or the functional design unit of a particular confidential IC specification design data (i.e., they may only have access to a black box of a particular design logic's function, rather than the particular design logic itself). These features of the present disclosure prevent users from gaining full and unrestricted access to IC design specification data, while allowing users to have enough limited access to design specification information data (e.g., for carrying out necessary processes at a specific stage without interrupting functionality for each stage of the typical IC design process).

As such, systems structured in accordance with various embodiments of the disclosure provide specific, technical solutions to technical problems faced by existing systems, the details of which are described hereinafter.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "user" should be understood to refer to an individual, group of individuals, business, organization, semiconductor design company, IC design engineers, system-on-chip (SoC) engineers, design-for-test (DFT) engineers, layout engineers, verification engineers, other personnel involved in an IC design process, and the like; the users referred to herein are involved in IC design process using trusted or untrusted computing devices (as defined herein).

The term "integrated circuit (IC) design process" refers to a design flow from IC specification design to the generation of an IC design end product. The typical IC design process may include various stages conducted by different IC design entities, as illustrated in FIG. 2.

The term "confidential integrated circuit (IC) design process" refers to an IC design process with protection mechanisms inserted in various stages of a typical IC design process. In embodiments, the protection mechanisms may include techniques, such as data encryption, data obfuscation, or SHM functional replacement and recovery.

The term "computing device" refers to computer hardware and/or software that is configured to access a service made available by a server. The server is often (but not always) on another computer system, in which case the computing device accesses the service by way of a network. Computing devices may include, without limitation, smart phones, tablet computers, laptop computers, wearables, personal computers, enterprise computers, and the like.

The term "trusted computing device" refers to a computing device that is determined to be less likely to initiate malicious attacks. Upon determined that a computing device is a trusted computing device, systems structured in accordance with various embodiments of the present disclosure may grant access for the trusted computing device to retrieve confidential data.

The term "untrusted computing device" refers to a computing device that is determined to be highly likely to initiate malicious attacks. Upon determined that a computing device is an untrusted computing device, systems structured in accordance with various embodiments of the present disclosure may restrict access to prevent the untrusted computing device from retrieving confidential data, or grant limited access for the untrusted computing device to retrieve a portion of the confidential data.

The term "networked computing device" refers to a computing device that is connected, via networks, to other computing devices in order to transmit and receive data (e.g., for communication).

The term "device identifier" refers to one or more items of data by which a computing device involved in an IC design process may be uniquely identified. For example, a device identifier may comprise ASCII text, a pointer, a memory address, and the like.

The term "design specification dataset" refers to electronically generated data set that comprises data associated with an IC design specification created be IC design engineers during the IC design process. The design specification dataset may comprise confidential design specification data and non-confidential design specification data.

The term "confidential design specification data" refers to a subset of the design specification dataset that comprises special design aspects or ideas that are essential to IP protection for a specific IC design.

The term "non-confidential design specification data" refers to a subset of the design specification dataset that comprises publicly disclosed design aspects or ideas that are well-known in the semiconductor industry and are not essential to IP protection for a specific IC design.

The term "encryption key" refers to electronically generated data generated to encrypt or decrypt data for enhancing data protection in transmission. The encryption key may comprise a random string of bits that are uniquely generated to scramble and unscramble particular data based at least in part on encryption algorithms, such as symmetric algorithms or asymmetric algorithms.

The term "obfuscation key" refers to an electronically generated data generated to obfuscate data for enhancing data protection in transmission. The obfuscation key may comprise a random string of bits that are uniquely generated to transform programming source codes into data that is difficult to be read by humans. The obfuscation key may be generated based at least in part on obfuscations algorithms, such as data masking algorithms associated with data shuffling, data substitution, randomizing, nullifying, and the like.

The term "security hard macro (SHM)" refers to a set of rules or procedures for designing logic functions of an IC, where the set of rules or procedures defines how a certain confidential design logic for a certain function should be mapped to a replacement design logic. The replacement design logic provides security protections in an IC design process by preventing malicious insiders or outsiders from retrieving information of the confidential design logic. The information of the confidential design logic may include information that is related to how the design elements of the confidential design logic are interconnected, or information related to the physical pathways and wiring patterns between the design elements of the confidential design logic. By way of utilizing the security hard macro technique, malicious insiders or outsiders may only access the replacement design logic of an IC, rather the confidential design logic itself.

The term "security hard macro (SHM) placeholder design element set" refers to a set of IC design elements that serves as placeholder logics inserted at the synthesis stage of an IC design process. Each SHM placeholder design element within the SHM placeholder design element set represents a functional design of a specific design logic. As a result of inserting SHM place holder design element into the IC design process, an untrusted computing device may only access the functional design of a portion of an IC design specification, rather than accessing the exact design logic of the IC design specification.

The term "security hard macro (SHM) placeholder portfolio" refers to an electronically generated dataset that is associated with pre-defined SHM place holder features (defined below) of all SHM place holder design elements included in the SHM placeholder portfolio.

The term "security hard macro (SHM) placeholder features" refers to an electronically generated dataset representing a plurality of mappings associated with each SHM placeholder design element of the SHM placeholder portfolio, where each mapping from a particular confidential design specification data subset to a particular SHM placeholder design element indicates the particular confidential design specification data subset may be replaced by the particular SHM placeholder design element at the synthesis stage of the IC design process.

The term "security hard macro (SHM) placeholder feature set" refers to an electronically generated dataset selected from the SHM placeholder features that are associated with mappings from a confidential design specification data subset to the SHM placeholder design element set for protecting the selected confidential data.

The term "logging request" refers to an electronically generated request associated with a database. A logging request may be generated by users operating computing devices associated with device identifiers, and may be transmitted to a trusted computing device for use in determining whether to grant a computing device access to the database (e.g., based at least in part on the device identifier and its access level (defined below)). In embodiments, the database may include confidential design specification data that requires higher protection against malicious users.

The term "access level" refers to a degree of authorization for a computing device to access confidential data. If the computing device is determined to have a high access level, the user operating the computing device may retrieve confidential data from a database. If the computing device is determined to have a low access level, the user operating the computing device may be restricted from retrieving the confidential data or granted limited access for retrieving only a portion of the confidential data from a database.

The term "pre-defined security access level" refers to a security access threshold level that is set by a user by way of using a computing device. The pre-defined security access level may be associated with confidential data and set by the user for determining whether other computing devices should have access to the confidential data. In circumstances where a computing device is determined to have an access level higher than the pre-defined security access level, the computing device may be granted access for retrieving confidential data. In circumstances where the computing device is determined to have an access level lower than the pre-defined security access level, the computing device may be restricted from retrieving the confidential data or granted limited access for retrieving only a portion of the confidential data from a database.

Example Apparatus Architecture for Implementing Embodiments of the Present Disclosure Methods, apparatuses, and computer program products of the present disclosure may be embodied by any of a variety of apparatuses, including trusted computing devices. For example, the method, apparatus, and computer program product of an example embodiment may be embodied by a trusted networked device (e.g., a trusted enterprise platform), such as a trusted server or other trusted network entity, configured to communicate with one or more untrusted computing devices. Additionally or alternatively, the trusted computing device may include fixed computing devices, such as a trusted personal computer or a trusted computer workstation. Still further, example embodiments may be embodied by any of a variety of trusted mobile devices, such as a portable digital assistant (PDA), mobile telephone, smartphone, laptop computer, tablet computer, wearable, or any combination of the aforementioned computing devices.

FIG. 3 illustrates an exemplary schematic diagram of a trusted computing device 300 that may be embodied by one or more confidential IC design processes. The trusted computing device 300 may include a processor 302, a memory 304 input/output circuitry 306, a communications circuitry 308, and a confidential data encryption/obfuscation and SHM circuitry 310. The trusted computing device 300 may be configured to execute the operations described herein. Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the trusted computing devices 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 302 (and/or co-processor or any other processing circuitry assisting or otherwise associated with the processor) may be in communication with the memory 304 via a bus for passing information among components of the apparatus. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus to carry out various functions in accordance with example embodiments of the present disclosure.

The processor 302 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 302 may be configured to execute instructions stored in the memory 304 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

In some embodiments, the trusted computing device 300 may include input/output circuitry 306 that may, in turn, be in communication with processor 302 to provide output to the user and, in some embodiments, to receive an indication of a user input. The input/output circuitry 306 may comprise a user interface and may include a display and may comprise a web user interface, a mobile application, a client device, a kiosk, or the like. In some embodiments, the input/output circuitry 306 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the trusted computing device 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The confidential data encryption/obfuscation and SHM circuitry 310 includes hardware configured to support a confidential IC design process. The confidential data encryption/obfuscation and SHM circuitry 310 may utilize processing circuitry, such as the processor 302, to perform these actions. The confidential data encryption/obfuscation and SHM circuitry 310 may send and/or receive data from client devices. In some embodiments, the confidential data encryption/obfuscation and SHM circuitry 310 may utilize data encryption or data obfuscation techniques to encrypt/obfuscate, upon receiving a design specification dataset from a computing device, confidential design specification data extracted from the design specification dataset. The confidential data encryption/obfuscation and SHM circuitry 310 may generate an encryption key or an obfuscation key for the encrypted/obfuscated confidential design specification data. The confidential data encryption/obfuscation and SHM circuitry 310 may generate an SHM placeholder feature set. The confidential data encryption/obfuscation and SHM circuitry 310 may further transmit, to an untrusted computing device associated with a design entity, the encrypted/obfuscated confidential design specification data, one of the encryption key or the obfuscation key, and the SHM placeholder feature set. In embodiments, the confidential data encryption/obfuscation and SHM circuitry 310 may further utilize SHM functional replacement technique at the synthesis stage to replace a design element subset with the SHM placeholder design element set based at least in part on the SHM placeholder feature set. In embodiments, after a design modification by a design entity, the confidential data encryption/obfuscation and SHM circuitry 310 may further utilize SHM functional recovery technique at the functional recovery stage to transform the modified design element set back into a modified confidential design specification.

As described above and as will be appreciated based at least in part on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Processes for Providing a Confidential Integrated Circuit Design Process FIG. 4 is an example flow chart illustrating an example method for providing a confidential IC design process, in accordance with some embodiments of the present disclosure.

As illustrated in FIG. 2, a typical IC design process generally includes a front-end processing stage 404, a synthesis stage, and a back-end processing stage 408. In the embodiments of the present disclosure, exemplary protection techniques may be inserted before or after one of the front-end processing stage 404, the synthesis stage, and the back-end processing stage 408. In one embodiment, data encryption, data obfuscation, and SHM identification protection techniques may be inserted before the front-end processing stage 404 to form a priming stage 402. In another embodiment, data encryption, data obfuscation, and SHM functional replacement techniques may be inserted at the synthesis stage to form a synthesis and SHM insertion stage 406. In another embodiment, data encryption, data obfuscation, and SHM functional recovery techniques may be inserted after the back-end processing stage 408 to form a functional recovery stage 410.

FIGS. 5-7 illustrate example flow charts for carrying out protection mechanisms in each of the inserted priming stage 402, synthesis and SHM insertion stage 406, and functional recovery stage 410.

FIG. 5 is an example flow chart illustrating an example protection mechanism in a priming stage 402 of a confidential IC design process, in accordance with some embodiments of the present disclosure.

In a priming stage 402 of a confidential IC design process, confidential design specification data representing valuable semiconductor design IPs 502 may be extracted from an IC design specification dataset. The extracted confidential design specification data 502 may be obfuscated or encrypted using a data obfuscation technique or a data encryption technique to form primed IPs 504. Based at least in part on the obfuscated or encrypted confidential design specification data representing the primed IPs 504, an obfuscation key 512 or an encryption key 506 may be generated as one of the outputs 510 of the priming stage 402.

The confidential design specification may also be used to generate a security hard macro (SHM) placeholder feature set 508 using a security hard macro (SHM) identification technique. In embodiments, the confidential design specification data is associated with a design element set. The SHM identification technique comprises identifying a confidential design specification data subset for replacing a design element subset with a security hard macro (SHM) placeholder design element set. The replacement is selected based at least in part on a security hard macro (SHM) placeholder portfolio associated with security hard macro (SHM) placeholder features representing mappings from confidential design specification data subsets to respective SHM placeholder design elements. The generated SHM placeholder feature set may be one of the outputs of the priming stage 402.

Optionally, non-confidential design specification data representing non-essential semiconductor design IPs 520 may be extracted from the IC design specification dataset. The extracted non-confidential design specification data 520 may also be obfuscated or encrypted using a data obfuscation technique or a data encryption technique to provide greater protection for the design specification dataset. Optionally, an access control mechanism may be provided for determining whether to grant access to a computing device based at least in part on the device identifier of the computing device and its associated access level. Optionally, a threat analysis may be conducted based at least in part on logging data associated with computing devices requesting to access the design specification dataset at the priming stage.

FIG. 6 is an example flow chart illustrating an example protection mechanism in a synthesis and SHM insertion stage 406 of a confidential IC design process, in accordance with some embodiments of the present disclosure.

In a synthesis and SHM insertion stage 406 of a confidential IC design process, an encryption key 506 or an obfuscation key 512 may be received from the outputs of the priming stage 402. Upon receiving the obfuscated or encrypted confidential design specification data representing the primed IPs 602, the obfuscated or encrypted confidential design specification data may be decrypted to obtain the original confidential design specification data. Once the confidential design specification data is obtained, it can further be synthesized into a design element set.

In a synthesis and SHM insertion stage 406 of a confidential IC design process, a security hard macro (SHM) placeholder feature set 508 may be received from one of the outputs of the priming stage 402. The SHM placeholder feature set 508 may be utilized in a security hard macro (SHM) functional replacement technique for replacing a design element subset of the synthesized design element set with the SHM placeholder design element set to form an updated design element set. After the replacement is completed, netlist data 604 may be generated, where the netlist data comprises electronic connections among design elements of the updated design element set. Optionally, the SHM placeholder feature set 608 may be updated to reflect the replacement of the design element subset by the SHM placeholder design element set.

Optionally, an encryption key 506 or an obfuscation key 512 may be received as inputs of the synthesis and SHM insertion stage 406. The encryption key 506 or the obfuscation key 512 may be used to decrypt the encrypted or obfuscated non-confidential design specification data to obtain the original non-confidential design specification data.

FIG. 7 is an example flow chart illustrating an example protection mechanism in a functional recovery stage 410 of a confidential IC design process, in accordance with some embodiments of the present disclosure.

In a functional recovery stage 410 of a confidential IC design process, a modified netlist data 702 is received, where the modified netlist data 702 reflects a modification of a design layout changed by a user operating a computing device associated with a design entity. Once the modified netlist data 702 is received, a modified design element subset may be retrieved utilizing the SHM functional recovery technique. Specifically, the modified design element subset is retrieved based at least in part on a modified security hard macro (SHM) placeholder feature set received from one of the outputs of the synthesis and SHM insertion stage 406. After the modified design element subset is retrieved, it may further be transformed into a modified confidential design specification data subset that may be used to generate the final GDSII file.

Optionally, an encryption key or an obfuscation key may be received as inputs of the functional recovery stage 410. The encryption key or the obfuscation key may be used to decrypt the encrypted or obfuscated non-confidential design specification data to obtain the original non-confidential design specification data.

FIG. 8 is an example flow chart illustrating an example method for providing a protection mechanism in a priming stage of a confidential IC design process, in accordance with some embodiments of the present disclosure.

At operation 802, the method 800 starts with receiving, from a first untrusted computing device, a design specification dataset. The design specification dataset comprises confidential design specification data and non-confidential design specification data. The confidential design specification data is associated with a design element set.

At operation 804, the method 800 continues with extracting the confidential design specification data from the design specification dataset. In other embodiments, at operation 804, the method 800 may further continues with extracting the non-confidential design specification data from the design specification dataset.

At operation 806, the method 800 continues with encrypting or obfuscating the confidential design specification data to produce encrypted confidential design specification data or obfuscated confidential design specification data. In other embodiments, at operation 806, the method 800 may further continues with encrypting or obfuscating the non-confidential design specification data to produce encrypted non-confidential design specification data or obfuscated non-confidential design specification data.

At operation 808, the method 800 continues with generating a first encryption key to be associated with the encrypted confidential design specification data, or a first obfuscation key to be associated with the obfuscated confidential design specification data. In other embodiments, at operation 808, the method 800 may further continues with generating a second encryption key to be associated with the encrypted non-confidential design specification data, or a second obfuscation key to be associated with the obfuscated non-confidential design specification data.

At operation 810, the method 800 continues with retrieving a confidential design specification data subset for replacing a design element subset with a security hard macro (SHM) placeholder design element set. The confidential design specification data subset is retrieved based at least in part on a security hard macro (SHM) placeholder portfolio associated with a plurality of security hard macro (SHM) placeholder features, wherein each SHM placeholder feature of the plurality of SHM placeholder features represents a mapping from a particular confidential design specification data subset to a particular SHM placeholder design element.

At operation 812, the method 800 continues with generating a security hard macro (SHM) placeholder feature set comprising those SHM placeholder features representing mappings from the confidential design specification data subset to the SHM placeholder design element set.

At operation 814, the method 800 continues with transmitting, to the first untrusted computing device, one of the encrypted confidential design specification data or the obfuscated confidential design specification data, one of the first encryption key or the first obfuscation key, and the SHM placeholder feature set. In other embodiments, at operation 808, the method 800 may further continues with transmitting, to the first untrusted computing device, one of the encrypted non-confidential design specification data or the obfuscated non-confidential design specification data, and one of the second encryption key or the second obfuscation key.

FIG. 9 is an example flow chart illustrating an example method for providing a protection mechanism in a synthesis and SHM insertion stage of a confidential IC design process, in accordance with some embodiments of the present disclosure.

At operation 902, the method 900 starts with receiving, from the first untrusted computing device, the SHM placeholder feature set, and one of the first encryption key or the first obfuscation key. The first encryption key or the first obfuscation key authorizes the first untrusted computing device to access the confidential design specification data. In other embodiments, at operation 902, the method 900 may further continues with receiving, from the first untrusted computing device, one of the second encryption key or the second obfuscation key. The second encryption key or the second obfuscation key authorizes the first untrusted computing device to access the non-confidential design specification data.

At operation 904, the method 900 continues with decrypting, using the first encryption key or the first obfuscation key, the encrypted confidential design specification data or the obfuscated confidential design specification data to retain the confidential design specification data. In other embodiments, at operation 904, the method 900 may further continues with decrypting, using the second encryption key or the second obfuscation key, the encrypted non-confidential design specification data or the obfuscated non-confidential design specification data to retain the non-confidential design specification data.

At operation 906, the method 900 continues with synthesizing the confidential design specification data into the design element set.

At operation 908, the method 900 continues with replacing, based at least in part on the SHM placeholder feature set, the design element subset with the SHM placeholder design element set to form an updated design element set.

At operation 910, the method 900 continues with generating netlist data comprising a plurality of electronic connections among design elements of the updated design element set.

At operation 912, the method 900 continues with transmitting, to a second untrusted computing device, the netlist data.

FIG. 10 is an example flow chart illustrating an example method for providing a protection mechanism in a functional recovery stage of a confidential IC design process, in accordance with some embodiments of the present disclosure.

At operation 1002, the method 1000 starts with receiving, from the second untrusted computing device, modified netlist data based at least in part on the netlist data. The modified netlist data comprises a plurality of electronic connections among design elements of a modified design element set.

At operation 1004, the method 1000 continues with retrieving a modified design element subset comprising a modified SHM placeholder design element set.

At operation 1006, the method 1000 continues with generating a modified security hard macro (SHM) placeholder feature set based at least in part on the modified SHM placeholder design element set by selecting SHM placeholder features representing mappings from the modified SHM placeholder design element set to a modified confidential design specification data subset.

At operation 1008, the method 1000 continues with extracting the modified design element set based at least in part on the modified SHM placeholder feature set.

At operation 1010, the method 1000 continues with transforming the modified design element set into the modified confidential design specification data subset based at least in part on the SHM placeholder portfolio to generate modified confidential design specification data.

At operation 1012, the method 1000 continues with transmit, to the first untrusted computing device, the modified confidential design specification data.

FIG. 11 is an example flow chart illustrating an example method for providing an access control mechanism in a confidential IC design process, in accordance with some embodiments of the present disclosure.

At operation 1102, the method 1100 starts with receiving, from a networked computing device associated with a device identifier, a logging request for retrieving the confidential design specification data or the modified confidential design specification data.

At operation 1104, the method 1100 continues with determining whether an access level associated with the device identifier meets or exceeds a pre-defined security access level.

Upon determining the access level associated with the device identifier meets or exceeds the pre-defined security access level, at operation 1106, the method 1100 continues with granting access by the networked computing device to the confidential design specification data or the modified confidential design specification data.

Conclusion

Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. An apparatus for providing a confidential integrated circuit design process, the apparatus comprising at least one processor and at least one non-transitory memory including program code, the at least one non-transitory memory and the program code configured to, with the processor, cause the apparatus to at least:

receive, from a first untrusted computing device, a design specification dataset comprising confidential design specification data and non-confidential design specification data, wherein the confidential design specification data is associated with a design element set and comprises information regarding how design elements of the design element set are interconnected and information related to physical pathways and wiring patterns between the design elements of the design element set;

extract the confidential design specification data from the design specification dataset;

encrypt the confidential design specification data to produce encrypted confidential design specification data;

generate a first encryption key to be associated with the encrypted confidential design specification data;

retrieve a confidential design specification data subset for replacing a design element subset with a security hard macro (SHM) placeholder design element set, wherein the design element subset comprises subset of design elements of the design element set, wherein the confidential design specification data subset comprises information regarding how design elements of the design element subset are interconnected and information related to physical pathways and wiring patterns between the design elements of the design element subset, wherein the confidential design specification data subset is retrieved based at least in part on a security hard macro (SHM) placeholder portfolio associated with a plurality of security hard macro (SHM) placeholder features, wherein each SHM placeholder feature of the plurality of SHM placeholder features represents a mapping from a particular confidential design specification data subset to a particular security hard macro (SHM) placeholder design element, and wherein the security hard macro (SHM) placeholder design element set provides access by the first untrusted computing device to only a functional design of the confidential design specification data subset and prevents access by the first untrusted computing device to an exact design logic of the confidential design specification data subset;

generate a security hard macro (SHM) placeholder feature set comprising those SHM placeholder features representing mappings from the confidential design specification data subset to the SHM placeholder design element set; and transmit, to the first untrusted computing device, the encrypted confidential design specification data, the first encryption key, and the SHM placeholder feature set.

2. The apparatus of claim 1, wherein the at least one non-transitory memory and the program code configured to, with the at least one processor, cause the apparatus to further:

obfuscate the confidential design specification data to produce obfuscated confidential design specification data;

generate a first obfuscation key to be associated with the obfuscated confidential design specification data; and transmit, to the first untrusted computing device, one of the encrypted confidential design specification data or the obfuscated confidential design specification data, one of the first encryption key or the first obfuscation key, and the SHM placeholder feature set.

3. The apparatus of claim 1, wherein the at least one non-transitory memory and the program code configured to, with the at least one processor, cause the apparatus to further:

receive, from the first untrusted computing device, the SHM placeholder feature set and the first encryption key, the first encryption key authorizing the first untrusted computing device to access the confidential design specification data;

decrypt the encrypted confidential design specification data using the first encryption key to retain the confidential design specification data;

synthesize the confidential design specification data into the design element set;

replace, based at least in part on the SHM placeholder feature set, the design element subset with the SHM placeholder design element set to form an updated design element set;

generate netlist data comprising a plurality of electronic connections among design elements of the updated design element set; and transmit, to a second untrusted computing device, the netlist data.

4. The apparatus of claim 2, wherein the at least one non-transitory memory and the program code configured to, with the at least one processor, cause the apparatus to further:

receive, from the first untrusted computing device, the SHM placeholder feature set, and one of the first encryption key or the first obfuscation key, wherein the first encryption key or the first obfuscation key authorizes the first untrusted computing device to access the confidential design specification data;

decrypt, using the first encryption key or the first obfuscation key, one of the encrypted confidential design specification data or the obfuscated confidential design specification data to retain the confidential design specification data;

synthesize the confidential design specification data into the design element set;

replace, based at least in part on the SHM placeholder feature set, the design element subset with the SHM placeholder design element set to form an updated design element set;
generate netlist data comprising a plurality of electronic connections among design elements of the updated design element set; and
transmit, to a second untrusted computing device, the netlist data.

5. The apparatus of claim 3, wherein the at least one non-transitory memory and the program code configured to, with the at least one processor, cause the apparatus to further:
receive, from the second untrusted computing device, modified netlist data based at least in part on the netlist data, the modified netlist data comprising a plurality of electronic connections among design elements of a modified design element set;
retrieve a modified design element subset comprising a modified security hard macro (SHM) placeholder design element set;
generate a modified security hard macro (SHM) placeholder feature set based at least in part on the modified SHM placeholder design element set by selecting SHM placeholder features representing mappings from the modified SHM placeholder design element set to a modified confidential design specification data subset;
extract the modified design element set based at least in part on the modified SHM placeholder feature set;
transform the modified design element set into the modified confidential design specification data subset based at least in part on the SHM placeholder portfolio to generate modified confidential design specification data; and
transmit, to the first untrusted computing device, the modified confidential design specification data.

6. The apparatus of claim 5, wherein the at least one non-transitory memory and the program code configured to, with the at least one processor, cause the apparatus to further:
receive, from a networked computing device associated with a device identifier, a logging request for retrieving the confidential design specification data or the modified confidential design specification data; and
upon determining an access level associated with the device identifier meets or exceeds a pre-defined security access level,
grant access by the networked computing device to the confidential design specification data or the modified confidential design specification data.

7. The apparatus of claim 1, wherein the at least one non-transitory memory and the program code configured to, with the at least one processor, cause the apparatus to further:
extract the non-confidential design specification data from the design specification dataset;
encrypt the non-confidential design specification data to produce encrypted non-confidential design specification data;
generate a second encryption key to be associated with the encrypted non-confidential design specification data; and
transmit, to the first untrusted computing device, the encrypted non-confidential design specification data and the second encryption key.

8. The apparatus of claim 2, wherein the at least one non-transitory memory and the program code configured to, with the at least one processor, cause the apparatus to further:
extract the non-confidential design specification data from the design specification dataset;
obfuscate the non-confidential design specification data to produce obfuscated non-confidential design specification data;
generate a second obfuscation key to be associated with the obfuscated non-confidential design specification data; and
transmit, to the first untrusted computing device, one of the encrypted non-confidential design specification data or the obfuscated non-confidential design specification data, and one of the second encryption key or the second obfuscation key.

9. The apparatus of claim 3, wherein the at least one non-transitory memory and the program code configured to, with the at least one processor, cause the apparatus to further:
receive, from the first untrusted computing device, the second encryption key, the second encryption key authorizing the first untrusted computing device to access the non-confidential design specification data; and
decrypt the encrypted non-confidential design specification data using the second encryption key to retain the non-confidential design specification data.

10. The apparatus of claim 4, wherein the at least one non-transitory memory and the program code configured to, with the at least one processor, cause the apparatus to further:
receive, from the first untrusted computing device, one of the second encryption key or the second obfuscation key, wherein the second encryption key or the second obfuscation key authorizes the first untrusted computing device to access the non-confidential design specification data; and
decrypt, using the second encryption key or the second obfuscation key, one of the encrypted non-confidential design specification data or the obfuscated non-confidential design specification data to retain the non-confidential design specification data.

11. A computer-implemented method for providing a confidential integrated circuit design process, comprising:
receiving, from a first untrusted computing device, a design specification dataset comprising confidential design specification data and non-confidential design specification data, wherein the confidential design specification data is associated with a design element set and comprises information regarding how design elements of the design element set are interconnected and information related to physical pathways and wiring patterns between the design elements of the design element set;
extracting the confidential design specification data from the design specification dataset;
encrypting the confidential design specification data to produce encrypted confidential design specification data;
generating a first encryption key to be associated with the encrypted confidential design specification data;
retrieving a confidential design specification data subset for replacing a design element subset with a security hard macro (SHM) placeholder design element set, wherein the design element subset comprises a subset of design elements of the design element set, wherein the confidential design specification data subset comprises information regarding how design elements of the design element subset are interconnected and information related to physical pathways and wiring patterns between the design elements of the design element subset, wherein the confidential design specification data subset is retrieved based at least in part on a security hard macro (SHM) placeholder portfolio associated with a plurality of security hard macro (SHM) placeholder features, wherein each SHM placeholder feature of the plurality of SHM placeholder features represents a mapping from a particular confidential design specification data subset to a particular security hard macro (SHM) placeholder design element, and wherein the security hard macro (SHM) placeholder design element set provides access by the first untrusted computing device to only a functional design of the confidential design specification data subset and prevents access by the first untrusted computing device to an exact design logic of the confidential design specification data subset;

generating a security hard macro (SHM) placeholder feature set comprising those SHM placeholder features representing mappings from the confidential design specification data subset to the SHM placeholder design element set; and transmitting, to the first untrusted computing device, the encrypted confidential design specification data, the first encryption key, and the SHM placeholder feature set.

12. The computer-implemented method of claim 11, further comprising:

obfuscating the confidential design specification data to produce obfuscated confidential design specification data;

generating a first obfuscation key to be associated with the obfuscated confidential design specification data; and transmitting, to the first untrusted computing device, one of the encrypted confidential design specification data or the obfuscated confidential design specification data, one of the first encryption key or the first obfuscation key, and the SHM placeholder feature set.

13. The computer-implemented method of claim 11, further comprising:

receiving, from the first untrusted computing device, the SHM placeholder feature set and the first encryption key, the first encryption key authorizing the first untrusted computing device to access the confidential design specification data;

decrypting the encrypted confidential design specification data using the first encryption key to retain the confidential design specification data;

synthesizing the confidential design specification data into the design element set;

replacing, based at least in part on the SHM placeholder feature set, the design element subset with the SHM placeholder design element set to form an updated design element set;

generating netlist data comprising a plurality of electronic connections among design elements of the updated design element set; and transmitting, to a second untrusted computing device, the netlist data.

14. The computer-implemented method of claim 12, further comprising:

receiving, from the first untrusted computing device, the SHM placeholder feature set, and one of the first encryption key or the first obfuscation key, wherein the first encryption key or the first obfuscation key authorizes the first untrusted computing device to access the confidential design specification data;

decrypting, using the first encryption key or the first obfuscation key, one of the encrypted confidential design specification data or the obfuscated confidential design specification data to retain the confidential design specification data;

synthesizing the confidential design specification data into the design element set;

replacing, based at least in part on the SHM placeholder feature set, the design element subset with the SHM placeholder design element set to form an updated design element set;

generating netlist data comprising a plurality of electronic connections among design elements of the updated design element set; and transmitting, to a second untrusted computing device, the netlist data.

15. The computer-implemented method of claim 13, further comprising:

receiving, from the second untrusted computing device, modified netlist data based at least in part on the netlist data, the modified netlist data comprising a plurality of electronic connections among design elements of a modified design element set;

retrieving a modified design element subset comprising a modified security hard macro (SHM) placeholder design element set;

generating a modified security hard macro (SHM) placeholder feature set based at least in part on the modified SHM placeholder design element set by selecting SHM placeholder features representing mappings from the modified SHM placeholder design element set to a modified confidential design specification data subset;

extracting the modified design element set based at least in part on the modified SHM placeholder feature set;

transforming the modified design element set into the modified confidential design specification data subset based at least in part on the SHM placeholder portfolio to generate modified confidential design specification data; and transmitting, to the first untrusted computing device, the modified confidential design specification data.

16. The computer-implemented method of claim 15, further comprising:

receiving, from a networked computing device associated with a device identifier, a logging request for retrieving the confidential design specification data or the modified confidential design specification data; and upon determining an access level associated with the device identifier meets or exceeds a pre-defined security access level, granting access by the networked computing device to the confidential design specification data or the modified confidential design specification data.

17. The computer-implemented method of claim 11, further comprising:

extracting the non-confidential design specification data from the design specification dataset;

encrypting the non-confidential design specification data to produce encrypted non-confidential design specification data;

generating a second encryption key to be associated with the encrypted non-confidential design specification data; and transmitting, to the first untrusted computing device, the encrypted non-confidential design specification data and the second encryption key.

18. The computer-implemented method of claim 12, further comprising:

extracting the non-confidential design specification data from the design specification dataset;

obfuscating the non-confidential design specification data to produce obfuscated non-confidential design specification data;

generating a second obfuscation key to be associated with the obfuscated non-confidential design specification data; and transmitting, to the first untrusted computing device, one of the encrypted non-confidential design specification data or the obfuscated non-confidential design specification data, and one of the second encryption key or the second obfuscation key.

19. The computer-implemented method of claim 13, further comprising:

receiving, from the first untrusted computing device, the second encryption key, the second encryption key authorizing the first untrusted computing device to access the non-confidential design specification data; and decrypting the encrypted non-confidential design specification data using the second encryption key to retain the non-confidential design specification data.

20. The computer-implemented method of claim 14, further comprising:

receiving, from the first untrusted computing device, one of the second encryption key or the second obfuscation key, wherein the second encryption key or the second obfuscation key authorizes the first untrusted computing device to access the non-confidential design specification data; and decrypting, using the second encryption key or the second obfuscation key, one of the encrypted non-confidential design specification data or the obfuscated non-confidential design specification data to retain the non-confidential design specification data.

* * * * *